United States Patent [19]

Galletti

[11] Patent Number: 5,059,312

[45] Date of Patent: Oct. 22, 1991

[54] SKIMMING DEVICE FOR OIL-EXTRACTION EQUIPMENT FOR TANKS OF COOLANT FLUIDS WITH OIL IN SUSPENSION

[75] Inventor: Alfonso Galletti, Turin, Italy

[73] Assignee: GI. PI. S.r.l., Turin, Italy

[21] Appl. No.: 564,477

[22] Filed: Aug. 8, 1990

[30] Foreign Application Priority Data

Aug. 8, 1989 [IT] Italy ............................ 67694 A/89

[51] Int. Cl.⁵ .............................................. C02F 1/40
[52] U.S. Cl. ..................................... 210/122; 210/172; 210/242.3; 210/540
[58] Field of Search ................. 210/242.1, 242.3, 122, 210/513, 540, 172

[56] References Cited

U.S. PATENT DOCUMENTS

| 317,576 | 8/1887 | Allen | 210/242.1 |
| 781,093 | 1/1905 | Post | 210/513 |
| 2,579,304 | 12/1951 | Crawford | 210/540 |
| 4,032,449 | 6/1977 | De Visser et al. | 210/242.1 |
| 4,094,338 | 6/1978 | Bauer | 210/242.1 |
| 4,132,645 | 1/1979 | Bottomley et al. | 210/540 |
| 4,781,827 | 11/1988 | Shields | 210/242.1 |
| 4,797,205 | 1/1989 | Kitamura | 210/242.3 |
| 4,867,872 | 9/1989 | Russell et al. | 210/540 |
| 4,872,997 | 10/1989 | Becker | 210/241 |

FOREIGN PATENT DOCUMENTS

| 38294 | 9/1908 | Austria . |
| 304705 | 4/1913 | Fed. Rep. of Germany . |
| 2728821 | 6/1977 | Fed. Rep. of Germany . |
| 2657488 | 6/1978 | Fed. Rep. of Germany . |

Primary Examiner—Stanley S. Silverman
Assistant Examiner—Christopher Upton
Attorney, Agent, or Firm—Sughrue, Mion, Zinn Macpeak & Seas

[57] ABSTRACT

A skimming device (14) for oil-extraction equipment for tanks (3) of coolant liquids with oil in suspension, comprising a support (15) carrying a hollow cylindrical body of adjustable height (20) on which a float member (23) is slidable axially, the float member having an upper wall (24) which communicates with the cavity of the cylindrical body and is adapted to position itself at the correct level ($L_1$, $L_2$) for skimming the suspended oil from the liquid in the tank.

3 Claims, 3 Drawing Sheets

SKIMMING DEVICE FOR OIL-EXTRACTION EQUIPMENT FOR TANKS OF COOLANT FLUIDS WITH OIL IN SUSPENSION

BACKGROUND OF THE INVENTION

The present invention relates in general to equipment for extracting oil from coolant liquids with oil in suspension, for machine tools and similar uses.

Such oil-extraction equipment includes an oil-separation unit which is supplied from a tank containing coolant liquid with extraneous oil to be separated on the surface. Skimming devices in the tank of the oil-extraction equipment are conventionally used to collect the oil and send it in suspension to the oil-extraction unit. These skimmers may be fixed or floating. In the first case, because the level of the liquid in the tank cannot be kept strictly constant and is normally subject to fluctuations, the skimmer may sometimes be situated either too far above or too far below the level at which the oil floats, obviously resulting in problems. In the second case, the fact that the skimmer floats enables it to be adjusted to the level of the liquid in the tank but does not ensure the necessary hydrostatic stability for the efficient collection of the suspended oil.

SUMMARY OF THE INVENTION

The object of the present invention is to avoid the aforesaid problems and to provide a skimming device for the tanks of oil-extraction equipment which, on the one hand, has self-levelling characteristics and, on the other hand, is adapted to ensure efficient removal of the suspended oil from the liquid in the tank in a laminar flow.

According to the invention, this object is achieved by means of a skimming device, characterised in that it comprises a stand adapted for insertion in the tank and carrying a support which is adjustable in height and to which an upwardly-open, hollow, cylindrical body with a vertical axis is fixed, the cylindrical body having an intake connector at its lower end for connection to the intake pump of the oil-extraction equipment and being intended to be immersed in the liquid in the tank, and a float member which is mounted for axial sliding on the cylindrical body and has an upper wall with a central aperture communicating with the cavity of the cylindrical body and which is adapted to position itself at the correct level for skimming the suspended oil from the liquid in the tank in order to enable it to pass towards the intake connector.

By virtue of this characteristic, the skimming device according to the invention can adjust itself to the variable level of the liquid in the tank, thus ensuring the efficient collection of the suspended oil in a continuous laminar flow.

In order further to facilitate the collection of the suspended oil, the upper wall of the float member is conveniently sloped from its peripheral edge towards the central aperture.

According to a preferred embodiment of the invention, the upper wall of the float member is formed with an annular air chamber which is coaxial with the central aperture and projects into the cavity of the cylindrical body.

BRIEF DESCRIPTION OF THE DRAWINGS

The invention will now be described in detail with reference to the appended drawings, provided purely by way of non-limiting example, in which.

DETAILED DESCRIPTION OF THE INVENTION

Figure 1:
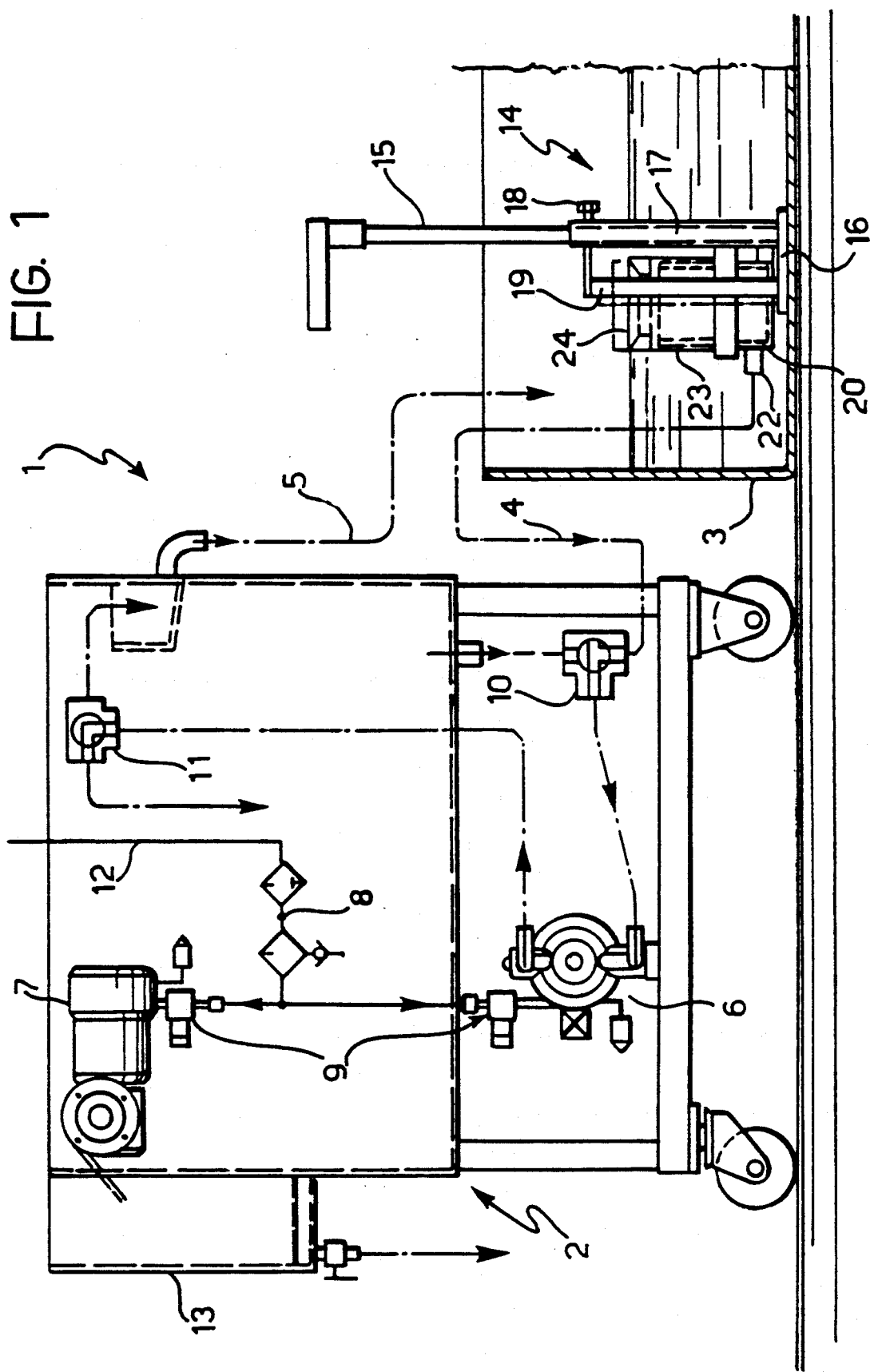
FIG. 1 is a schematic, partially-sectioned elevational view of oil-extraction equipment provided with a skimming device according to the invention.

With reference initially to FIG. 1, equipment normally used in installations operating with machine tools to extract oil from coolant liquids with oil in suspension is generally indicated 1.

The oil-extraction equipment 1 essentially comprises a trolley unit 2 which houses the oil-separating members and a tank 3 which contains the coolant liquid with suspended oil and is connected to the unit 2 by means of an intake pipe 4 and a return pipe 5.

The unit 2 is of generally known type and will therefore not be described in detail. For the purposes of the present invention, it suffices to explain that it includes an intake pump 6 associated with a geared motor unit 7, a filtering and lubricating unit 8, pressure regulators 9, respective three-way ball valves 10, 11 in the intake pipe 4 and the return pipe 5, a supply pipe 12, and a unit 13 for collecting the separated oil.

A skimming device 14 according to the invention is inserted in the tank 3 and its function is to remove the suspended oil from the coolant liquid in the tank 3 and supply the oil to the unit 2 through the intake pipe 4.

Figure 2:
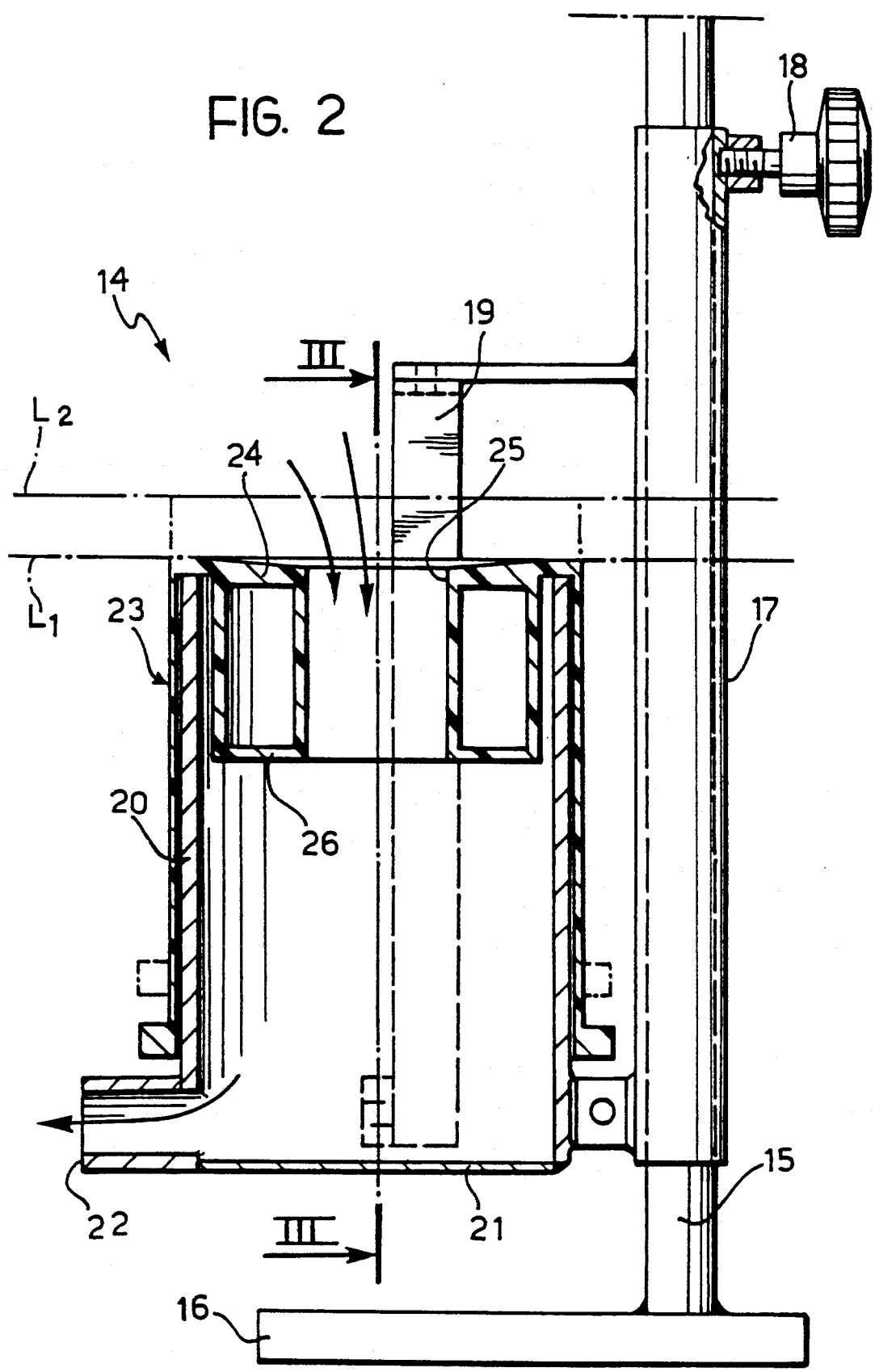
FIG. 2 is a view of the skimming device in partial vertical section, on an enlarged scale.
Figure 3:
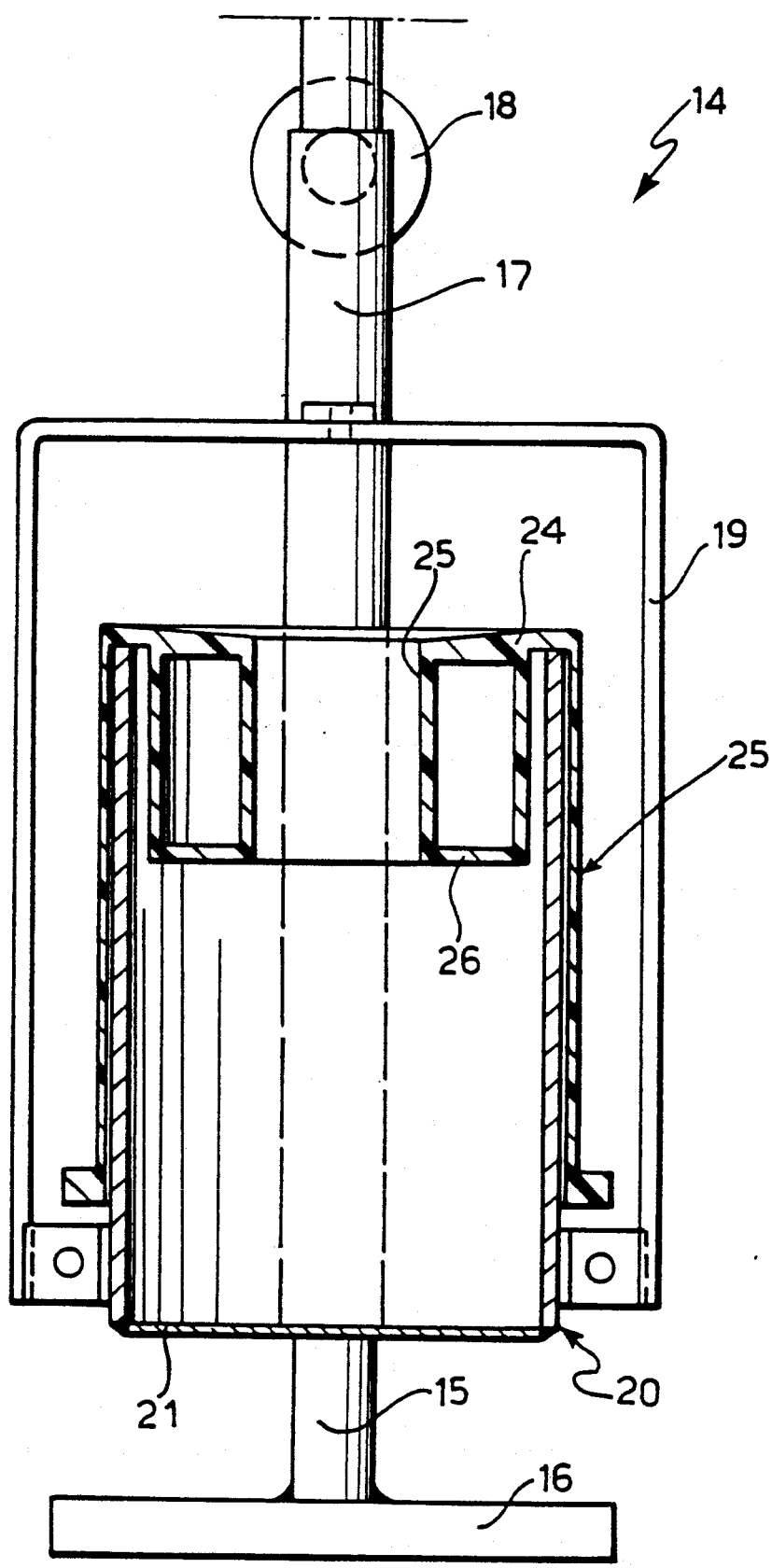
FIG. 3 is a section taken on the line III—III of FIG. 2.

With reference in greater detail to FIGS. 2 and 3, the skimming device 14 comprises a vertical support column 15 provided with a lower support base 16 and a tube 17 which can slide along the column 15 and be locked relative thereto in the preselected adjustment position by means of a screw knob 18.

A support frame 19 is cantilevered on the tube 17 and a hollow cylindrical body 20 with a vertical axis is fixed thereto. The cylindrical body 20 is open at the top but is closed at the bottom by a base wall 21 defining an outlet connector 22 for connection to the intake pipe 4.

A float member, indicated 23, whose shape is complementary to that of the cylindrical body 20, is mounted for axial sliding thereon. The float member 23 is normally of plastics material and has an upper wall 24 with a central aperture 25 which communicates with the cavity of the cylindrical body 20. The upper surface of the wall 24 slopes from its periphery towards the central aperture 25. Moreover, the wall 24 is formed with an integral annular air chamber 26 coaxial with the aperture 25 and extending inwardly of the cylindrical body 20.

In use, the skimmer 14 is positioned in the tank 3 as shown in FIG. 1, with its base 16 resting on the bottom of the tank 3. The vertical position of the tube 17 relative to the support column 15 is then adjusted in dependence on the mean level of the liquid in the tank 3 so as to keep the cylindrical body 20 immersed in the liquid.

By virtue of the presence of the annular air chamber 26, the float member 23 can float relative to the cylindrical body 20 so as to adjust its position in dependence on the level of the liquid in the tank. This self-adjustment causes the outer surface of the wall 24 to skim the free surface of the liquid in which the extraneous oil is suspended. The position of the float member 23 shown in continuous outline in FIG. 2, in which the inner surface of the wall 24 rests on the upper edge of the cylindrical body 20, represents the lower skimming level $L_1$ and the configuration shown in broken outline corresponds to that assumed by the float member 23 at an upper skimming level $L_2$. Obviously, the adjustment of the tube 17 relative to the column 15 enables the skimmer 14 to be adapted to a wide range of lower levels $L_1$.

Once the self-adjustment position of the float member 23 has been established, the suspended oil gradually pours into the cylindrical body 20 with a constant laminar flow, passing through the aperture 25 in the float member 23. The sloped configuration of the upper surface of the wall 24 enables the oil to be conveyed effectively towards the aperture 25 and, after passing through the cylindrical body 20, the oil reaches the outlet connector 22 which supplies the oil-extraction unit through the intake pipe 4. In the oil-extraction unit, the oil is separated in known manner and collected in the separator 13, whilst the coolant liquid is sent back to the tank 3 through the return pipe 5.

The self-adjusting capability of the float member 23 compensates effectively and continuously for the inevitable fluctuations in the level of the free surface of the liquid in the tank 3.

According to a variant which is not shown, the sliding tube 17 may be replaced by a pivoting arm carrying the body 20 with the float member 23 and possibly provided with auxiliary floats.

I claim:

1. A skimming device for an oil-extraction equipment for a tank containing a coolant liquid with oil in suspension and including an intake pump, said skimming device comprising a stand (15) inserted in the tank (3) and carrying a support (17, 18, 19) which is adjustable in height and to which an upwardly-open, hollow, cylindrical body (20) with a vertical axis is fixed, the cylindrical body having a lateral wall which forms an axially elongated guide and defines a cavity, the cylindrical body (20) further having intake connector (22) at its lower end for connection to the intake pump (6) of the oil-extraction equipment (1) and being immersed in the coolant liquid in the tank (3), and a float member (23), having a side wall whose shape is complementary to that of the cylindrical body (20), being mounted for axial, telescopic sliding over the lateral wall of the cylindrical body (20) and having an upper wall (24) with a central aperture (25) communicating with the cavity of the cylindrical body (20) and which positions itself at a level ($L_1$, $L_2$) for skimming the suspended oil from the coolant liquid in the tank (3) in order to enable the suspended oil to pass towards the intake connector (22), wherein the upper wall (24) is formed with an annular air chamber (26) which is coaxial with the central aperture (25) and projects into the cavity of the cylindrical body (20).

2. A skimming device according to claim 1, wherein the upper wall (24) of the float member (23) slopes from its periphery towards the central aperture (25).

3. A skimming device according to claim 1, wherein the annular air chamber (26) has an outer surface which is spaced apart from an inner surface of the side wall of the float member (23), so as to form an annular space for receiving an upper end of the upwardly-open, cylindrical body (20).

* * * * *